United States Patent [19]

Ohara et al.

[11] 3,890,248

[45] June 17, 1975

[54] CATALYTIC OXIDE ADAPTED FOR THE PREPARATION OF UNSATURATED CARBONYL COMPOUNDS

[75] Inventors: Takashi Ohara, Nishinomiya; Michikazu Ninomiya, Kobe; Isao Yanagisawa, Ikeda; Michio Ueshima, Nishinomiya; Masahiro Takata, Toyonaka, all of Japan

[73] Assignee: Nippon Shokubai Kagaku Kogyo Co., Ltd., Osaka, Japan

[22] Filed: Aug. 29, 1973

[21] Appl. No.: 392,500

Related U.S. Application Data

[62] Division of Ser. No. 211,680, Dec. 23, 1971, Pat. No. 3,799,978.

[52] U.S. Cl. ............... 252/456; 252/457; 252/458; 252/459; 260/533 N
[51] Int. Cl. .... B01j 11/06; B01j 11/32; B01j 11/22
[58] Field of Search................... 252/456, 457, 459; 260/533 N

[56] References Cited

UNITED STATES PATENTS 3,642,930  2/1972  Grasselli et al. ................ 252/456 X
3,766,092  10/1973  Honda et al. ................... 252/456 X

*Primary Examiner*—Carl F. Dees
*Attorney, Agent, or Firm*—Sherman and Shalloway

[57] ABSTRACT

A catalytic oxide, particularly adapted for the preparation of unsaturated carbonyl compounds through the catalytic vapor phase oxidation of olefins, wherein the atomic ratio among the constituent elements, Co:Fe:Bi:W:Mo:Si:Z, is within the range of 2.0–20.0 : 0.1–10.0 : 0.1–10.0 : 0.5–10.0 : 2.0–11.5 : 0–15.0 : 0.005–1.0, with the proviso that W plus Mo equals 12.0, and Z represents an alkaline earth metal.

2 Claims, No Drawings

CATALYTIC OXIDE ADAPTED FOR THE PREPARATION OF UNSATURATED CARBONYL COMPOUNDS

This application is a division of application Ser. No. 211,680, filed Dec. 23, 1971 now U.S. Pat. No. 3,799,978.

This invention relates to a catalyst composition in a catalytic oxide, specifically adapted for use in a process for the preparation of unsaturated carbonyl compounds from olefins. More particularly, the invention relates to such catalytic oxide useful for the preparation of the corresponding unsaturated carbonyl compounds, for example, acrolein and acrylic acid, by the catalytic vapor phase oxidation of olefins having at least three carbon atoms.

In the industrial scale production of unsaturated carbonyl compounds by the catalytic vapor phase oxidation of the corresponding olefins, the use of a catalyst which gives high conversion of olefins and shows high selectivity for the object unsaturated carbonyl compounds is particularly important.

As the catalyst conventionally employed in the preparation of acrolein or methacrolein by the catalytic vapor phase oxidation of propylene or isobutylene, respectively, a catalytic oxide compound of molybdenum, tellurium, cadmium or zinc, and oxygen is recommended, for example, by the prior art disclosed in Japanese Official Pat. Gazette, Publication No. 10605/68. Also the same Gazette, Publication No. 6245/69 teaches the use of a catalytic oxide composed of nickel, cobalt, iron bismuth, molybdenum, phosphorus and oxygen. However, per-pass yields of the unsaturated carbonyl compounds obtained through the use of such known catalysts are far from satisfactory in commercial operation.

Accordingly, it is an object of this invention to provide a catalyst composition; i.e., catalytic oxide specifically adapted for use in a process for producing unsaturated carbonyl compounds with industrial advantage.

It has been discovered that the above object of the invention can be accomplished by the proviso of a catalytic oxide which comprises cobalt, iron, bismuth, tungsten, molybdenum, silicon, an alkaline earth metal and oxygen, since in the presence of such catalyst, acrolein and acrylic acid can be obtained from propylene with very high per-pass yield.

The catalyst or catalytic oxide of the present invention is characterized in that its constituent elements are present at atomic ratios satisfying the following: Co:Fe:Bi:W:Mo:Si:Z = 2.0–20.0 : 0.1–10.0 : 0.1–10.0 : 0.5–10.0 : 2.0–11.5 : 0–15.0 : 0.005–1.0 (provided that W + Mo = 12.0, and Z represents an alkaline earth metal; i.e., Be, Mg, Ca, Sr, Ba or Ra). Presumably, the oxygen is present in the catalyst in the form of complex metal oxide or metallic acid salt. Consequently, the oxygen content of the catalyst varies depending on the atomic ratios of the metallic elements constituting the catalyst.

The catalyst of the invention can be prepared through the steps of, for example, mixing an aqueous solution of ammonium p-tungstate, adding to the mixture aqueous solutions of, respectively, cobalt nitrate, iron nitrate, and bismuth nitrate, further adding thereto an aqueous solution of a hydroxide or carbonate of an alkaline earth metal and if desired, subsequently adding colloidal silica as a silicon source, concentrating the system by evaporation, molding the resulting clay-like substance and calcining the same at temperatures between 350°–600°C, in an air current. Obviously, the starting materials of the catalyst are not limited to the ammonium salt, nitrate, hydroxide and carbonate as stated above, but other various compounds are equally useful as long as they can form the catalytic oxide upon calcination.

As the carrier, for example, silica gel, alumina, silicon carbide, diatomaceous earth, titanium oxide and "Celite", etc. may be employed, particularly preferred carriers being silica gel, titanium oxide and Celite.

The catalytic vapor phase oxidation using the catalytic oxide of the invention is performed by introducing a gaseous mixture composed of 1–10 volume percent of an olefin such as propylene, 5–15 volume percent of molecular oxygen, 20–60 volume percent of steam and 20–50 volume percent of an inert gas, onto the catalyst prepared as above, at temperatures ranging from 240°–450°C, and pressures ranging from the normal atmospheric pressure to 10 atmospheres. Suitable contact time ranges from 1.0 to 10.0 seconds. The reaction can be carried out either with a fixed bed or a fluidized bed. Through the above-specified operation, such results as 97–99.5 mol percent conversion of propylene, 82–37 mol percent selectivity for acrolein and 8–12 mol percent selectivity for acrylic acid can be obtained. These achievements are markedly superior to those of the prior art.

Although the present invention is not bound by any theory, the excellent results of the present process are presumably due to the appropriate adjustment of catalytic ability accomplished by the concurrent presence, in the catalytic oxide of the invention, of molybdate and tungstate of cobalt, iron and bismuth, with oxides; and presence of heteropolyacid compounds containing silicon and the alkaline earth metal, etc. This presumption is substantiated by the fact that the selectivities are markedly improved by the presence of the alkaline earth metal, as demonstrated in the Control which appears hereinafter.

The terms "conversion", "selectivity", and "per-pass yield" are used in this specification with the definitions as set forth below:

$$\text{Conversion (\%)} = \frac{\text{Mol number of reacted olefin}}{\text{Mol number of supplied olefin}} \times 100$$

$$\text{Selectivity (\%)} = \frac{\text{Mol number of formed unsaturated carbonyl compound}}{\text{Mol number of reacted olefin}} \times 100$$

$$\text{Per-pass yield (\%)} = \frac{\text{Mol number of formed unsaturated carbonyl compound}}{\text{Mol number of supplied olefin}} \times 100$$

The invention will be described in greater detail hereinafter with reference to working examples and a control, it being understood that the scope of this invention is by no means restricted thereby.

EXAMPLE 1

Seventy grams of cobalt nitrate were dissolved in 20 ml of distilled water. Also 24.3 grams of ferric nitrate were dissolved in 20 ml of distilled water, and 29.2 grams of bismuth nitrate were dissolved in 30 ml of distilled water, which was made acidic with 6 ml of concentrated nitric acid. Separately, in 150 ml of water, 106.2 grams of ammonium molybdate and 32.4 grams of ammonium p-tungstate were dissolved under heating and stirring. The foregoing three aqueous solutions of nitrates were dropped into the resultant aqueous solution of the ammonium salts, and further an aqueous solution formed by dissolving 0.21 gram of magnesium hydroxide in 15 ml of distilled water and 24.4 grams of 20% silica-sol were added thereto. The suspension thus formed was heated under stirring to cause evaporation of the liquid component. The resulting solid was molded and calcined at 450°C for 6 hours in an air current to form a catalyst. The metallic composition of the catalyst was as below, in terms of the atomic ratio:

$$Co_4Fe_1Bi_1W_2Mo_{10}Si_{1.35}Mg_{0.06}$$

Sixty ml of the catalyst obtained were packed in a stainless steel U-shaped tube of 20 mm in diameter. The tube was immersed in a molten nitrate bath heated at 320°C, and through the same tube a gaseous mixture composed of 4 volume percent of propylene, 51 volume percent of air and 45 volume percent of steam was passed and reacted with a contact time of 2.7 seconds. The results were as shown in the subsequent Table.

EXAMPLE 2

Example 1 was repeated except that the reaction temperature and the contact time were changed to 330°C and 1.8 seconds, respectively. The results were as shown below:

EXAMPLE 4

A catalyst of the composition in terms of atomic ratio: $Co_4Fe_1Bi_1W_2Mo_{10}Si_{1.35}Ca_{0.06}$ was prepared in the manner similar to the catalyst preparation in Example 1, except that 0.266 gram of calcium hydroxide was used in lieu of 0.21 gram of magnesium hydroxide.

The catalyst was used in the reaction of Example 1, with the results as shown in the subsequent Table.

EXAMPLE 5

A catalyst of the composition in terms of atomic ratio: $Co_4Fe_1Bi_1W_3Mo_9Si_{1.5}Ca_{0.8}$ was prepared in accordance with the procedure of Example 1. Using the catalyst, the reaction was carried out under the same conditions as in Example 1. The results were as shown in the subsequent Table.

EXAMPLE 6

A catalyst of the composition in terms of atomic ratio: $Co_4Fe_1Bi_1W_2Mo_{10}Si_{1.35}Sr_{0.06}$ was prepared in a manner similar to Example 1, except that 0.762 gram of strontium nitrate was used in place of 0.21 gram of magnesium hydroxide.

The catalyst was used in the reaction of Example 1, with the results as shown in the subsequent Table.

EXAMPLE 7

A catalyst of the composition in the terms of atomic ratio: $Co_4Fe_1Bi_1W_2Mo_{10}Si_{1.35}Ba_{0.06}$ was prepared in a manner similar to Example 1, except that 0.941 gram of barium nitrate was used instead of 0.21 gram of magnesium hydroxide.

This catalyst was used in the reaction of Example 1, with the results as shown in the subsequent Table.

CONTROL

Example 1 was repeated, except that the use of magnesium hydroxide was omitted. The composition of the resulting catalyst was as follows, in terms of atomic ratio: $Co_4Fe_1Bi_1W_2Mo_{10}Si_{1.35}$.

This catalyst was used in the reaction of Example 1, with the results as given in the following Table.

TABLE

| Ex. No. | Co | Fe | Bi | W | Mo | Si | Ca | Mg | Sr | Ba | Reaction Temp. (°C) | Propylene Conversion (Mol %) | Selectivity (mol %) Acrolein | Selectivity (mol %) Acrylic acid | Per-pass yield (mol %) Acrolein | Per-pass yield (mol %) Acrylic acid |
|---|---|---|---|---|---|---|---|---|---|---|---|---|---|---|---|---|
| 1 | 4 | 1 | 1 | 2 | 10 | 1.35 | — | 0.06 | — | — | 320 | 98.0 | 87.2 | 9.0 | 85.5 | 8.8 |
| 4 | 4 | 1 | 1 | 2 | 10 | 1.35 | 0.06 | — | — | — | 320 | 99.5 | 82.0 | 12.1 | 81.6 | 12.0 |
| 5 | 4 | 1 | 1 | 3 | 9 | 1.50 | 0.08 | — | — | — | 315 | 97.0 | 83.1 | 12.3 | 80.6 | 11.9 |
| 6 | 4 | 1 | 1 | 2 | 10 | 1.35 | — | — | 0.06 | — | 315 | 98.5 | 81.0 | 11.4 | 79.8 | 11.2 |
| 7 | 4 | 1 | 1 | 2 | 10 | 1.35 | — | — | — | 0.06 | 315 | 99.0 | 81.5 | 10.8 | 80.8 | 10.6 |
| Control | 4 | 1 | 1 | 2 | 10 | 1.35 | — | — | — | — | 320 | 94.5 | 71.5 | 11.4 | 67.5 | 10.7 |

| | |
|---|---|
| Propylene conversion | 98.1% |
| Selectivity to acrolein | 88.0% |
| Selectivity to acrylic acid | 8.2% |

EXAMPLE 3

The reaction was carried out under the same conditions as in Example 1, with the exception that the starting gaseous mixture was composed of 7 volume percent of propylene, 63 volume percent of air, and 30 volume percent of steam, and the reaction temperature was raised to 325°C. The following results were obtained:

| | |
|---|---|
| Propylene conversion | 97.8% |
| Selectivity to acrolein | 86.0% |
| Selectivity to acrylic acid | 9.8% |

We claim:

1. A catalyst composition consisting essentially of a catalytic oxide in which the atomic ratio among the constituent elements Co:Fe:Bi:W:Mo:Si:Z is within the range of 2.0–20.0 : 0.1–10.0 : 0.1–10.0 : 0.5–10.0 : 2.0–11.5 : 1–15.0 : 0.005–1.0, with the proviso that W plus Mo equals 12.0, and Z represents an alkaline earth metal and the oxygen content of the catalytic oxide is determined by the valence requirements of the other elements present.

2. The catalyst composition of claim 1, wherein said catalytic oxide is supported on a carrier.

* * * * *

UNITED STATES PATENT OFFICE
CERTIFICATE OF CORRECTION

Patent No. 3,890,248　　　　　　　　Dated June 17, 1975

Inventor(s) Takashi Ohara et al.

It is certified that error appears in the above-identified patent and that said Letters Patent are hereby corrected as shown below:

Priority information should be inserted and read as follows:

-- December 26, 1970   Japan................118,789/70 --

Signed and Sealed this second Day of March 1976

[SEAL]

Attest:

RUTH C. MASON
Attesting Officer

C. MARSHALL DANN
Commissioner of Patents and Trademarks